(12) United States Patent
Okada

(10) Patent No.: US 10,819,910 B2
(45) Date of Patent: Oct. 27, 2020

(54) IMAGE CAPTURING APPARATUS, CONTROL METHOD OF SAME, AND PROGRAM

(71) Applicant: CANON KABUSHIKI KAISHA, Tokyo (JP)

(72) Inventor: Koichi Okada, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/552,645

(22) Filed: Aug. 27, 2019

(65) Prior Publication Data

US 2019/0387173 A1  Dec. 19, 2019

Related U.S. Application Data

(63) Continuation of application No. 15/081,611, filed on Mar. 25, 2016, now Pat. No. 10,425,587.

(30) Foreign Application Priority Data

Mar. 31, 2015 (JP) ................................ 2015-072106

(51) Int. Cl.
*H04N 5/225* (2006.01)
*H04N 5/232* (2006.01)

(52) U.S. Cl.
CPC ..... *H04N 5/23293* (2013.01); *H04N 5/23209* (2013.01)

(58) Field of Classification Search
CPC ........... H04N 5/23209; H04N 5/23212; H04N 5/23296; H04N 5/23258; H04N 5/23287; H04N 5/23293; H04N 5/23216; G03B 17/12; G03B 17/14; G02B 7/14
See application file for complete search history.

(56) References Cited

U.S. PATENT DOCUMENTS

| 10,425,587 B2* | 9/2019 | Okada | H04N 5/23293 |
| 2006/0268357 A1* | 11/2006 | Vook | H04N 1/00244 |
| | | | 358/448 |
| 2012/0105588 A1* | 5/2012 | Yamamoto | H04N 5/23209 |
| | | | 348/46 |
| 2012/0274836 A1* | 11/2012 | Mori | G03B 17/14 |
| | | | 348/360 |
| 2012/0327274 A1* | 12/2012 | Taguchi | H04N 5/232 |
| | | | 348/240.2 |
| 2014/0300808 A1* | 10/2014 | Pan | G03B 17/14 |
| | | | 348/373 |
| 2016/0105613 A1* | 4/2016 | Takanashi | H04N 5/23209 |
| | | | 348/333.02 |

\* cited by examiner

*Primary Examiner* — Kelly L Jerabek
(74) *Attorney, Agent, or Firm* — Canon U.S.A., Inc., IP Division

(57) ABSTRACT

A camera capable of interchanging a mount as a connection part that connects with a lens. Under control of a system control unit, when the power of the camera is in an on state, a type of the mount attached to the camera is discriminated to determine mount interchange. When it is determined that the mount interchange has been performed, with respect to a menu including a plurality of items and a My Menu in which items selected by a user from among the items included in the menu are registered, an item unnecessary for the discriminated type of the mount among the items of the menu is set to non-display, and when the item set to the non-display has been registered in the My Menu, the item is reset in the My Menu.

16 Claims, 11 Drawing Sheets

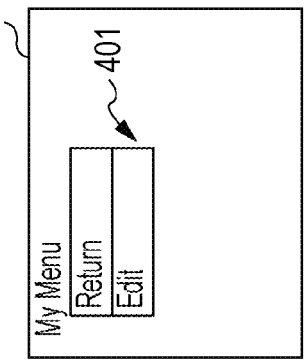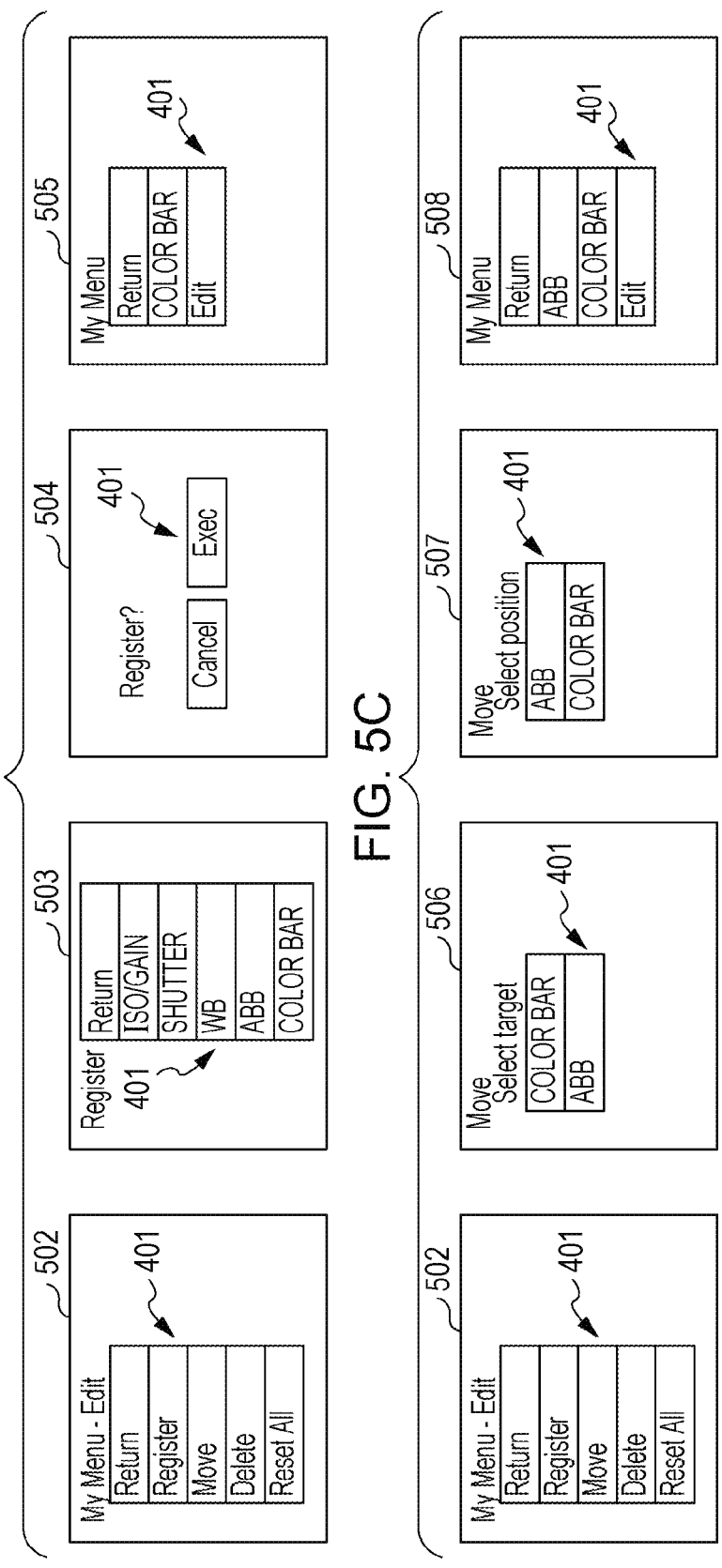

IMAGE CAPTURING APPARATUS, CONTROL METHOD OF SAME, AND PROGRAM

CROSS REFERENCE TO RELATED APPLICATIONS

The present application is a continuation of U.S. patent application Ser. No. 15/081,611, filed on Mar. 25, 2016, which claims priority from Japanese Patent Application No. 2015-072106 filed Mar. 31, 2015, which are hereby incorporated by reference herein in their entirety.

BACKGROUND OF THE INVENTION

Field of the Invention

The present invention relates to an image capturing apparatus in which a mount is interchangeable, a control method of the same, and a program.

Description of the Related Art

Since a mount which is a connection part of a lens-interchangeable camera and a lens has an interface which varies according to types of lenses, some cameras provide a plurality of models of mounts in accordance with types of lenses. Thus, when the lens-interchangeable camera is used, it is important to select equipment in consideration of a combination of the camera and a lens for use. However, such a situation is disadvantageous for rental business handling a lot of equipment in terms of both of costs and management. Under such circumstances, a camera having a system in which a mount is interchangeable by a hand of a user himself/herself is desired and actually commercialized.

However, interchanging of a mount is a work requiring technical knowledge and tool, such as adjustment of flange back, and the work is not easy for a user and such a specification is not relevant for most users. On the other hand, when a type of a mount becomes different, not only a type of a lens which is able to be connected to a camera varies, but also a communication scheme between the lens and the camera, and performances and functions of the camera side become different, so that the camera needs to have a specification in consideration of such differences. At this time, when a specification premising that a mount is interchanged is provided, there is an issue can occur that a function insignificant for most users appears to be a usable function. This may cause confusion for a user, so that functions are normally allocated according to a type of a mount at a time of shipping from a factory. In this case as well, however, it is necessary to prevent inconsistency from occurring in order to deal with a case where a mount is interchanged by a hand of a user.

A similar issue also can occur when a lens is interchanged, and such is disclosed in Japanese Patent Laid-Open No. 4-280239 and Japanese Patent Laid-Open No. 4-280237. Japanese Patent Laid-Open No. 4-280239 is characterized in that all settings are reset when interchange of a lens unit is detected. Moreover, Japanese Patent Laid-Open No. 4-280237 is characterized in that a camera is started in a predetermined state when a lens unit is detected at a start-up time.

SUMMARY OF THE INVENTION

In contrast to lens interchange, which can easily be performed by a user, it is beneficial for mount interchange, which is not performed by most users, to provide a function so as not to confuse a user. For example, a lens-interchangeable camera in which a mount is interchangeable beneficially includes a system of behaving as though it were another product when a type of the mount is different.

The present invention has been made in view of points as described above, and can prevent inconsistency from occurring in a function of an image capturing apparatus after mount interchange, so as not to confuse a user.

According to an aspect of the present invention, an image capturing apparatus, in which a mount serving as a connection part with a lens is interchangeable, includes a discrimination unit configured to discriminate a type of the mount attached to the image capturing apparatus; and a management unit configured to manage a menu including a plurality of items and a customizable menu in which an item selected by a user from among the items included in the menu is registered, in which the management unit performs an updating process for setting an item which is unnecessary for the type of the mount discriminated by the discrimination unit among the items of the menu to non-display or invalid display, and resetting all or a part of the items registered in the customizable menu or setting all or the part of the items registered in the customizable menu to invalid display.

Further features of the present invention will become apparent from the following description of exemplary embodiments with reference to the attached drawings.

BRIEF DESCRIPTION OF THE DRAWINGS

FIGS. 5A to 5E are diagrams illustrating an example of a shift of a My Menu screen.

DESCRIPTION OF THE EMBODIMENTS

Description will hereinafter be given for some embodiments of the present invention with reference to accompanying drawings.

First Exemplary Embodiment

Figure 1:
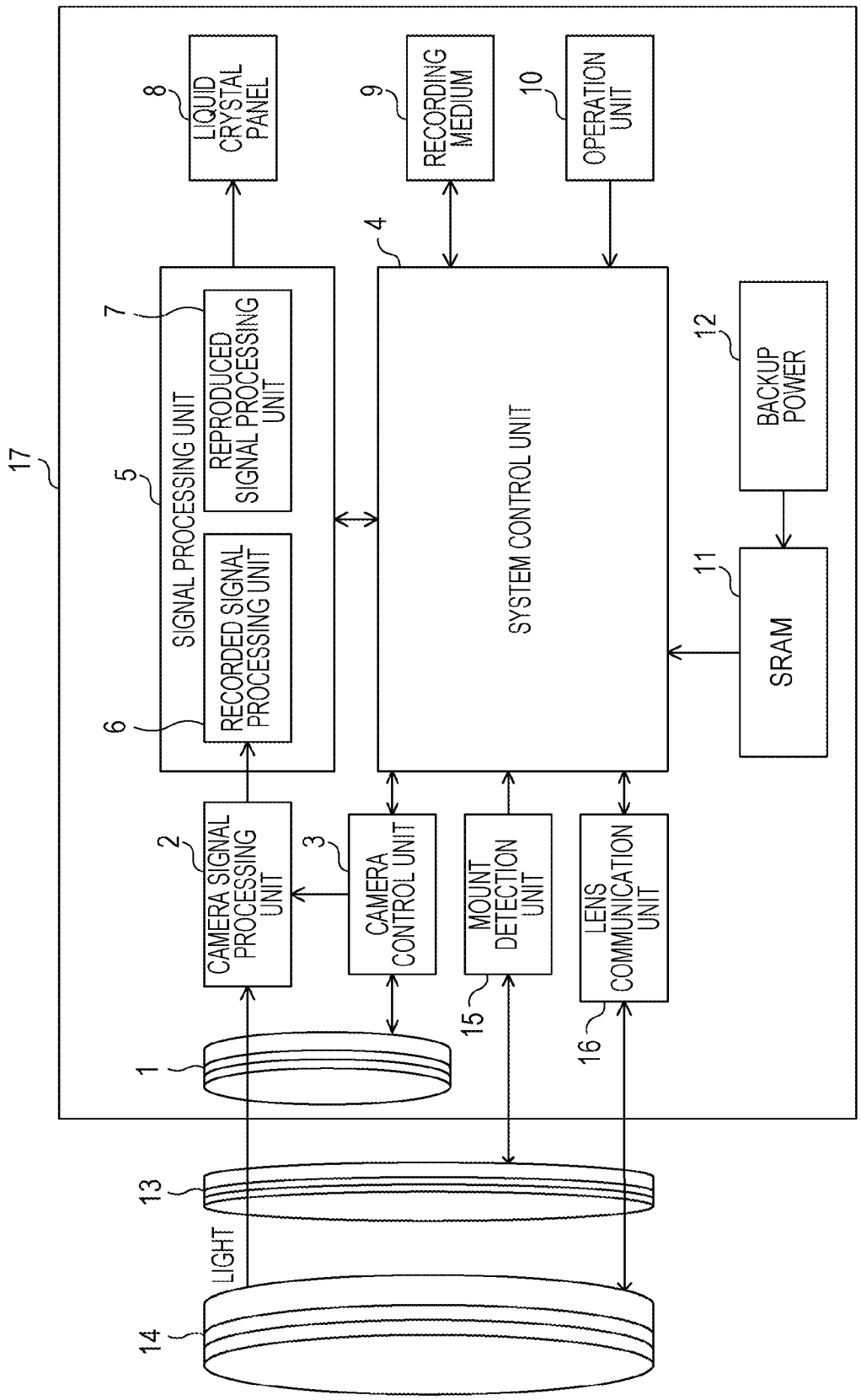
FIG. 1 is a diagram illustrating a configuration of a lens-interchangeable digital video camera according to a first exemplary embodiment.

FIG. 1 is a diagram illustrating a configuration of a lens-interchangeable digital video camera (hereinafter, referred to as a camera) which is an image capturing apparatus according to the present exemplary embodiment.

An interchangeable lens 14 is connected to a camera main body 17 of the camera through a mount 13. The mount 13 is a connection part with the lens 14, and is an interface for connecting the lens 14 and the camera main body 17. The lens 14 and the mount 13 are able to be connected only when having the same structure, and are not able to be connected when having different structures.

In the camera main body 17, an image capturing unit 1 is formed of an image capturing element such as a CCD or a CMOS, an autofocus mechanism, and the like. The image capturing unit 1 adjusts a focal point, a light amount and the like with respect to an image sensing field in accordance with an instruction from a camera control unit 3, converts an optical image of the image sensing field, which is focused through the lens 14, into a video signal, and sends the video signal to a camera signal processing unit 2.

The camera control unit 3 is formed of a microcomputer and the like, and controls an entire camera system in accordance with instructions from a system control unit 4, an operation unit 10 and the like.

A signal processing unit 5 is formed of an integrated circuit, a microcomputer and the like, and performs a recording operation to a recording medium 9, or a reproduction operation of a recorded video image in accordance with an instruction from the system control unit 4. The signal processing unit 5 includes a recorded signal processing unit 6 and a reproduced signal processing unit 7. The recorded signal processing unit 6 applies a predetermined signal process to a signal output from the camera signal processing unit 2 and sends the resultant. The reproduced signal processing unit 7 applies a predetermined process to a reproduced signal, mixes character information and print range frame display information, which are transmitted from the system control unit 4, with a video signal, and sends the resultant to a liquid crystal panel 8. The liquid crystal panel 8 reflects a video image and performs display of various information of a main body with characters and signs, guide display at a time of menu setting, and the like.

The operation unit 10 is formed of operation members such as a power switch, a menu key, and a cross key (up/down/left/right/set). When the menu key is pressed down, the system control unit 4 receives an instruction thereof and makes a menu display request to the signal processing unit 5, and a video image with which a menu screen is superimposed is displayed on the liquid crystal panel 8. For example, when a cursor is moved in the menu screen by using the cross key to change a setting of a desired item, a content thereof is stored in a SRAM 11. Since a voltage is supplied from a backup power 12 to the SRAM 11, even when a power of the camera is turned off, the content of the menu which is set here is kept on being held.

A mount detection unit 15 detects information for discriminating a type of the mount 13.

A lens communication unit 16 carries out, for example, voltage conversion for performing serial communication, and the lens 14 and the camera main body 17 mutually exchange data with the serial communication. Control of the lens 14 and acquisition of status information of the lens 14 are performed through the lens communication unit 16. The serial communication carried out at this time is decided based on a determination result of the mount detection unit 15. It may be determined that communication is not allowed depending on a type of the mount 13.

Figure 2A:
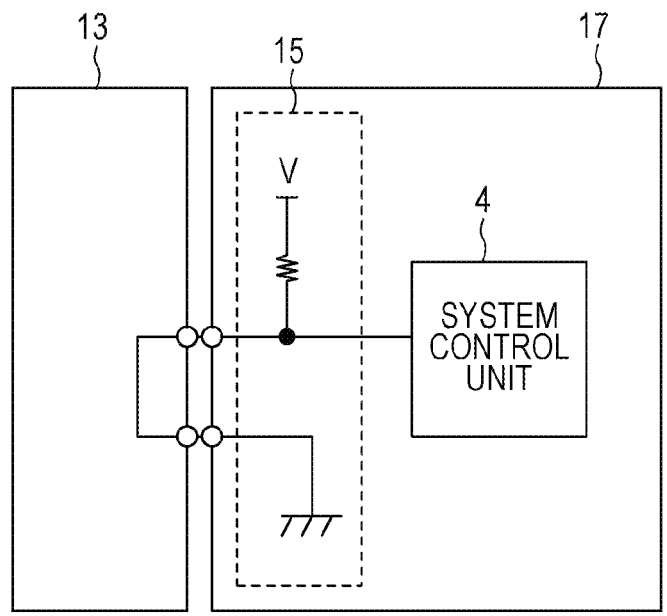
FIGS. 2A and 2B are diagrams illustrating a configuration for discriminating a type of a mount.
Figure 2B:
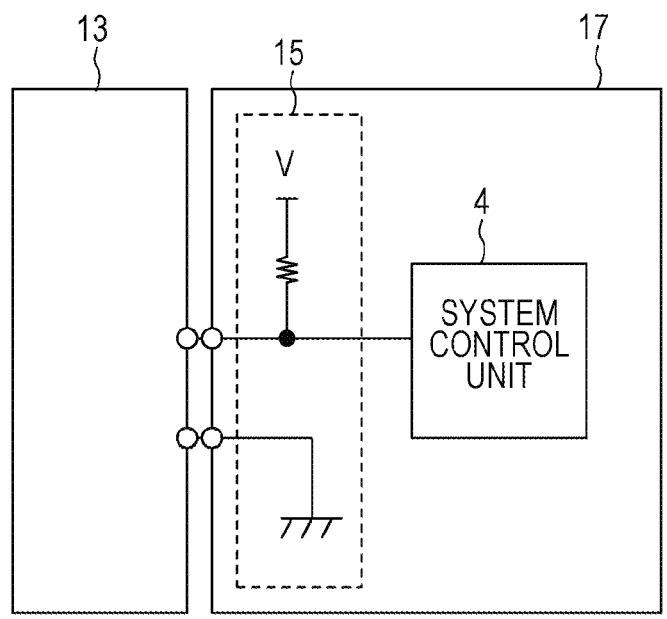

FIGS. 2A and 2B are diagrams illustrating a configuration for discriminating a type of the mount 13 in the camera according to the present exemplary embodiment. A connection signal line between the mount 13 and the camera main body 17 is short-circuited in FIG. 2A and is open in FIG. 2B. The system control unit 4 discriminates the type of the mount 13 depending on whether a signal obtained through the mount detection unit 15 has a high level or a low level. The system control unit 4 decides a subsequent operation based on a detection result of the mount detection unit 15. Though a method for discriminating the type of the mount 13 based on two types of high and low is indicated here, much more types of the mount 13 may be discriminated by dividing a voltage V through resistors as long as a system monitors a signal with an A/D conversion port of the system control unit 4.

Figure 3:
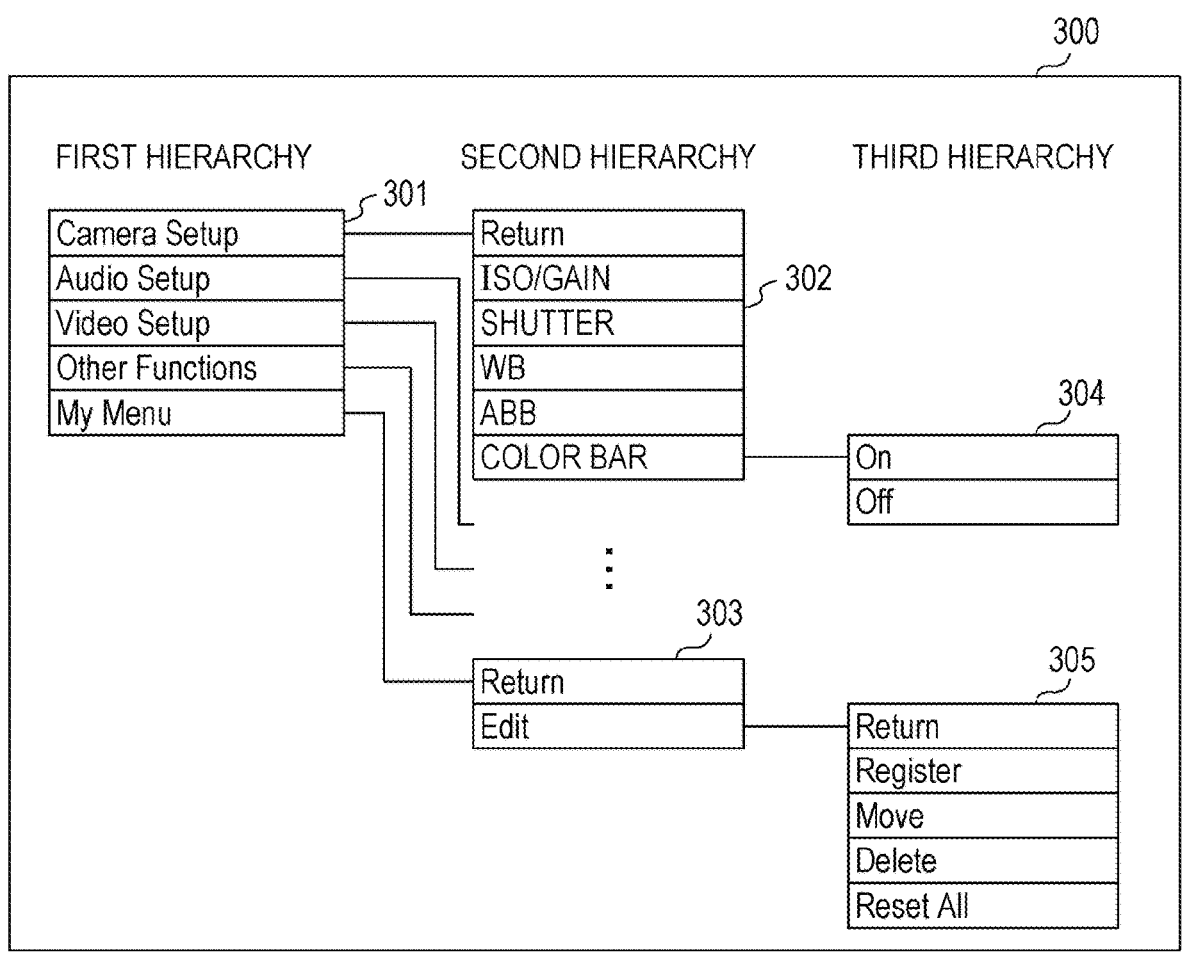
FIG. 3 is a diagram illustrating a configuration example of a menu.

FIG. 3 is a diagram illustrating a configuration example of a menu in the camera according to the present exemplary embodiment. When the menu key included in the operation unit 10 is pressed down, a menu is opened and a menu screen is displayed on the liquid crystal panel 8.

A menu 300 is managed with a hierarchical structure, and a first hierarchy 301 has items of "Camera Setup", "Audio Setup", "Video Setup", "Other Function", and "My Menu".

There is a second hierarchy under the first hierarchy 301, and the second hierarchy has a detailed item of each item of the first hierarchy 301, for example, a detailed item 302 of "Camera Setup" and a detailed item 303 of "My Menu".

There is a third hierarchy under the second hierarchy, and the third hierarchy may have, for example, a setting item 304 or an edit item 305.

Figure 4A:
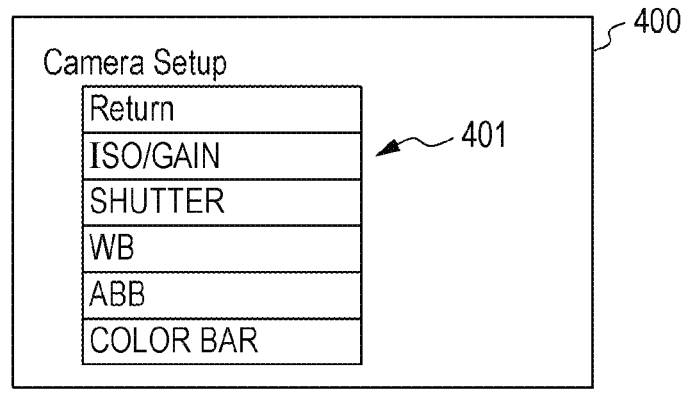
FIGS. 4A to 4C are diagrams illustrating an example of a menu screen.

The menu 300 is displayed on the liquid crystal panel 8 as a menu screen 400 as illustrated in FIG. 4A. FIG. 4A illustrates a state where the detailed item 302 of "Camera Setup" is displayed.

An operation on the menu screen 400 is performed by using the cross key or the like included in the operation unit 10. When the cross key is operated in an up direction, a cursor 401 moves to an upper item. When the cross key is operated in a down direction, the cursor 401 moves to a lower item. When the cross key is operated in a left direction, the cursor 401 moves, if there is a higher hierarchy, to the higher hierarchy. When the cross key is operated in a right direction, the cursor 401 moves, if there is a lower hierarchy, to the lower hierarchy, and, if there is no lower hierarchy, opens the setting item 304. When a SET key of the cross key is pressed down on a desired item by moving the cursor 401 in the setting item 304, a setting is decided.

Figure 4B:
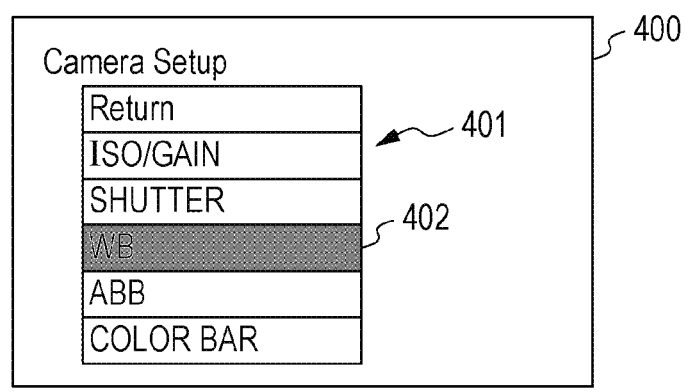
Figure 4C:
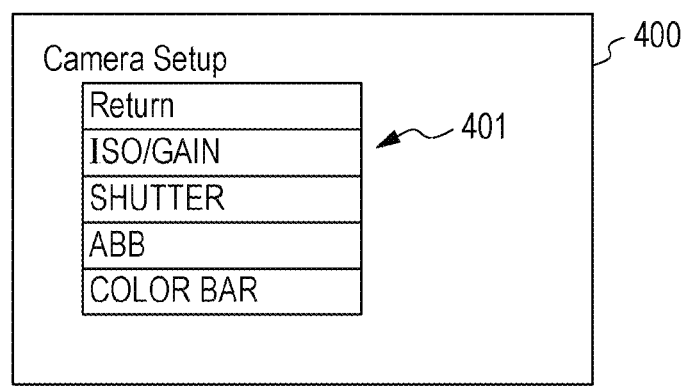

Though items which are usable in the camera are basically displayed on the menu screen 400, items which cannot be used temporarily because of some restriction or in which there is no change in an operation even when setting is temporarily performed exist in some cases. For example, there is a case where a specification in which a WB (white balance) setting cannot be performed is desired when the lens 14 is not attached to the camera. In such a case, when a setting of a function thereof is allowed, an actual operation of the camera and an item of the menu are not matched. Thus, there is a system in which an item which is not usable temporarily is displayed in a gray-out state in order to prevent a user from being confused. FIG. 4B illustrates one example of a display form thereof, in which an item 402 in gray-out display is an unusable item. In addition to the gray-out display, there is also a method for hiding an unusable item itself. A WEB setting is hidden in FIG. 4C. For example, the gray-out display is effective for indicating that the function is temporarily unusable, and the non-display is effective for indicating that the function does not exist. As a case where the function does not exist, considered is a case where the function is not usable, for example, unless the function is expanded as an option and is only prepared in advance at a time of design.

Next, description will be given for the My Menu with reference to FIGS. 5A to 5E. FIGS. 5A to 5E are diagrams illustrating an example of a shift of a My Menu screen. My Menu is a function for selecting, registering and collecting items which are used frequently by a user from among items in a menu, and is called a custom menu, favorite or the like.

FIG. 5A illustrates a state where the detailed item 303 of "My Menu" is displayed. In a state where nothing is registered in the My Menu as illustrated in FIG. 5A, there are items of "Return" and "Edit" in a My Menu screen 501. "Return" is an option for moving to a higher hierarchy, and when the cursor 401 is moved to a position of "Return" to perform a defining operation, the My Menu screen 501 moves to the first hierarchy. "Edit" is an entrance for moving to a lower hierarchy, and when the cursor 401 is moved to a position of "Edit" to press down a right key of the cross key or a SET key of the cross key, the My Menu screen 501 moves to the lower hierarchy.

When "Edit" is selected and defined in the My Menu screen 501, an Edit screen 502 is displayed as illustrated in FIGS. 5B to 5E. The Edit screen 502 has items of "Return", "Register", "Move", "Delete", and "Reset All". "Return" is an item for moving to a higher hierarchy similarly to the above.

When "Register" is selected and defined in the Edit screen 502 as illustrated in FIG. 5B, a Register target selection screen 503 for designating which item is to be registered in the My Menu is displayed. The Register target selection screen 503 has the almost same configuration as that of a normal menu screen, but an item which cannot be registered in the My Menu is not displayed therein. When the item which is desired to be registered in the My Menu is designated, a confirmation screen 504 is displayed. When "Cancel" is selected in the confirmation screen 504, registration is not executed, and when "Exec" is selected, registration is executed. For example, when "Color Bar" displayed in the Register target selection screen 503 is registered, "Color Bar" is added in a My Menu executed screen 505.

When "Move" is selected and defined in the Edit screen 502 as illustrated in FIG. 5C, a Move target selection screen 506 for rearranging items registered in the My Menu is displayed. When the cursor 401 is moved to the item which is desired to be rearranged and the SET key of the cross key is pressed down in the Move target selection screen 506, a Move target move screen 507 is displayed. When the item which is previously selected moves in accordance with a vertical operation of the cross key and the SET key is pressed down in the Move target move screen 507, a movement destination is decided. For example, when "ABB" displayed in the Move target move screen 507 is moved to the upper side of "COLOR BAR", "ABB" is rearranged to be in the upper side of "COLOR BAR" in a My Menu executed screen 508.

Figure 5D:
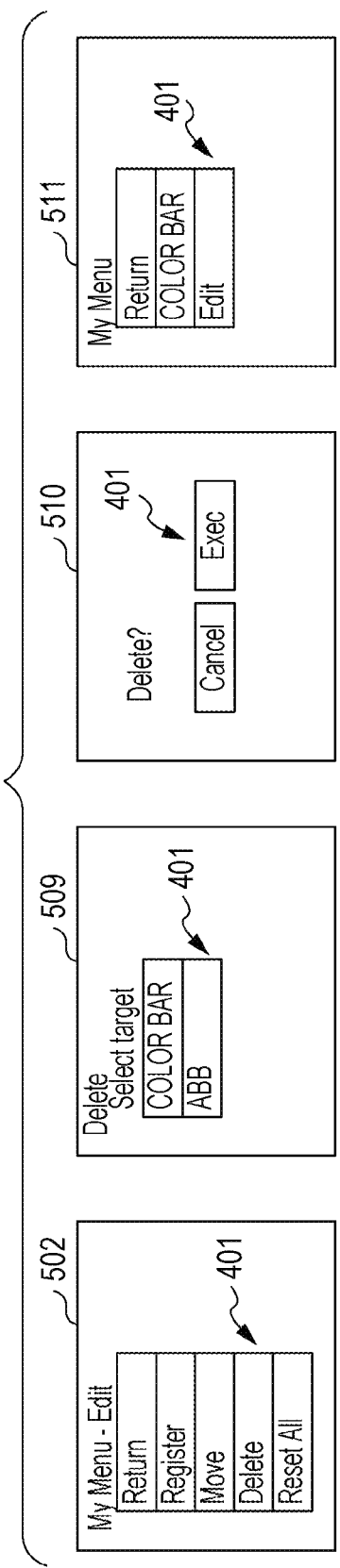

When "Delete" is selected and defined in the Edit screen 502 as illustrated in FIG. 5D, a Delete target selection screen 509 for resetting an item registered in the My Menu is displayed. When the cursor 401 is moved to an item desired to be reset and the SET key of the cursor key is pressed down in the Delete target selection screen 509, a confirmation screen 510 is displayed. When "Cancel" is selected in the confirmation screen 510, the reset is not executed, and when "Exec" is selected, the reset is executed. For example, when "ABB" displayed in the Delete target selection screen 509 is reset, items other than "ABB" which is reset remain in a My Menu executed screen 511.

Figure 5E:
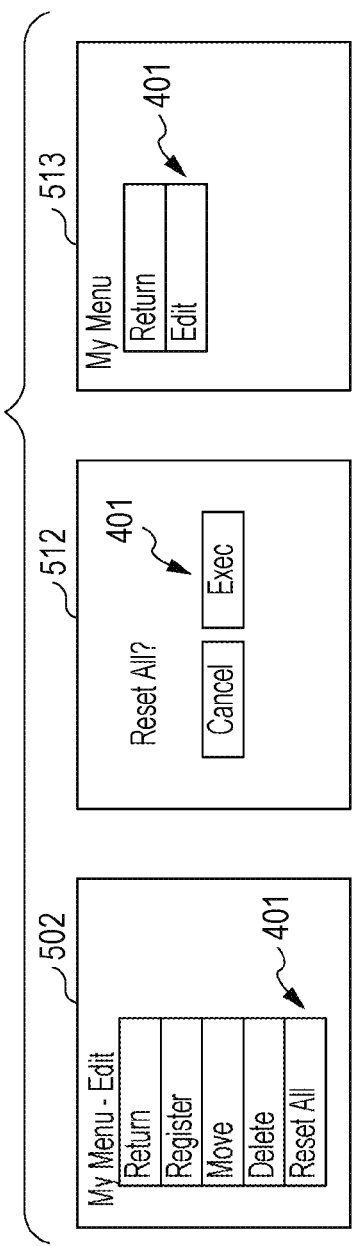

When "Reset All" is selected and defined in the Edit screen 502 as illustrated in FIG. 5E, a confirmation screen 512 for resetting all the items registered in the My Menu is displayed. When "Cancel" is selected in the confirmation screen 512, all resetting is not executed, and when "Exec" is selected, all resetting is executed. When all resetting is executed, a My Menu executed screen 513 has a state in which nothing is registered.

Figure 6:
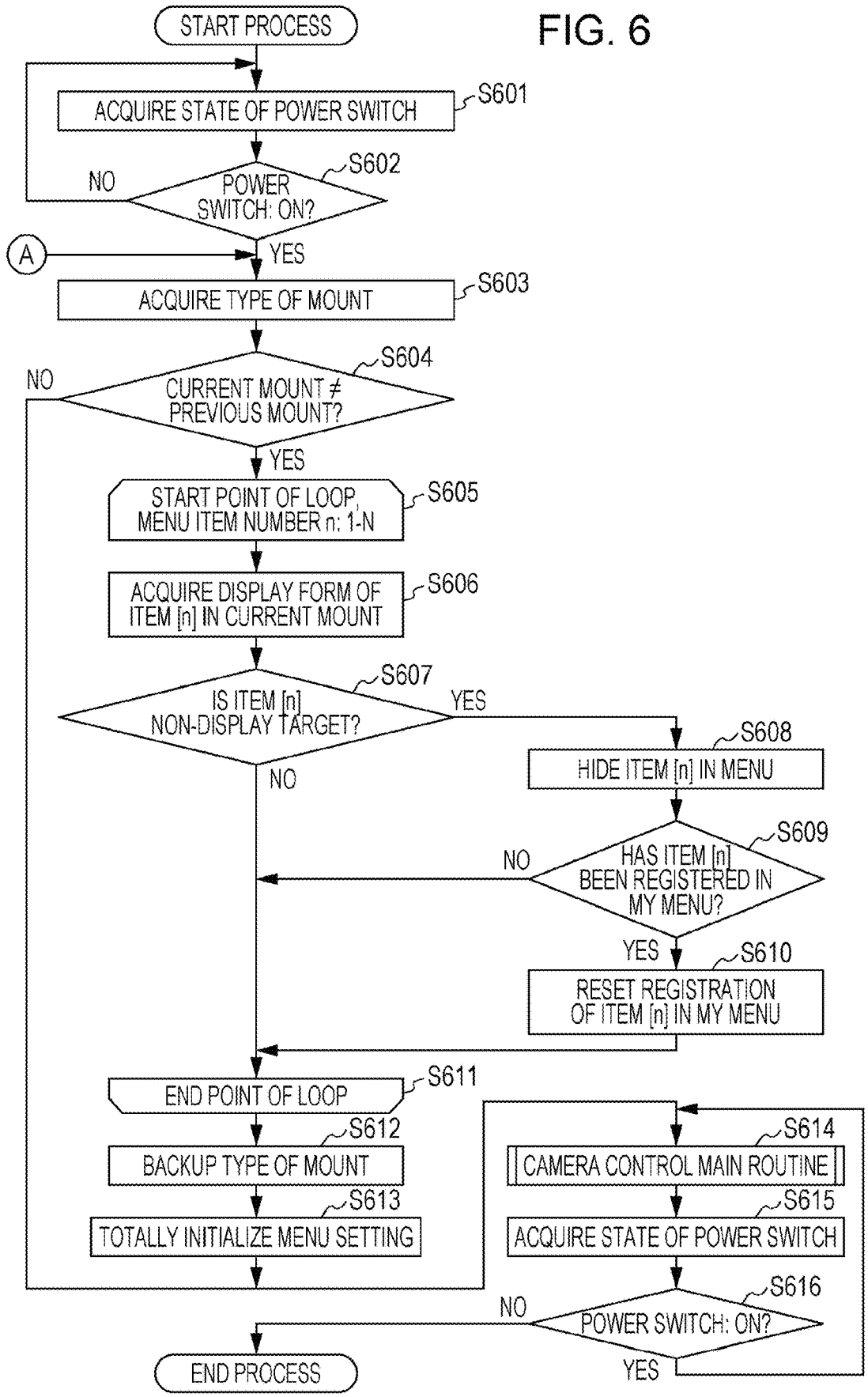
FIG. 6 is a flowchart illustrating an example of a process for performing determination of mount interchange when the camera according to the first exemplary embodiment starts and updating a menu and a My Menu.

FIG. 6 is a flowchart illustrating an example of a process for performing determination of mount interchange when the camera according to the present exemplary embodiment starts and updating the menu and the My Menu.

When the power of the camera is in the off state, the system control unit 4 acquires a state of the power switch for monitoring at step S601.

The system control unit 4 confirms whether or not the power switch is turned on at step S602. When the power switch remains in the off state, the procedure returns to step S601, and when the power switch is in the on state, the procedure proceeds to step S603.

At step S603, the system control unit 4 discriminates and acquires a type of the mount with the mount detection unit 15 as described in FIGS. 2A and 2B.

The system control unit 4 confirms whether the current mount has the same type as that of the mount when the camera is started previously at step S604. Type information of the mount in the previous time is stored in the SRAM 11, and the type of the mount discriminated at step S603 is compared to the type information of the mount stored in the SRAM 11, so that mount interchange is able to be determined. The type information of the mount stored in the SRAM 11 has an initial value when the camera is shipped from a factory or a value obtained by update in the backup process at step S604. When it is determined as the same type at step S604, the procedure proceeds to step S614. On the other hand, when it is determined as not the same type, that is, determined that the mount has been interchanged at step S604, the procedure proceeds to step S605.

Steps S605 to S611 serve as a routine of the process for updating the menu and the My Menu.

Step S605 is a start point of a loop, in which the menu is formed of an item of n=1 to N.

In order to check influence of mount interchange for the items in the menu one by one, a display form of the item [n] is acquired at step S606. Examples of a result acquired here include "display", "invalid display", and "non-display". The "display" indicates that there is an item in which a setting can be changed, and most items are normally determined as the "display". The "Invalid display" indicates an item in which a setting cannot be changed at that timing but can be changed if a condition is satisfied. Here, the "invalid display" is displayed in a gray-out state as illustrated in FIG. 4B. The "non-display" indicates an item which is not displayed in the camera. This is a scheme used when a camera having a different type as a product is designed with the same firmware, and achieves an effect of providing an operation as a completely different camera. Though description is given in the present exemplary embodiment by assuming that the user interchanges the mount, the mount interchange actually requires advanced techniques, knowledge, and tool, so that it is not relevant for most users. In such a case, display of the menu which is not relevant for most users (an item which is not required depending on a type of the mount) causes confusion, so that the confusion is prevented by hiding the menu.

Whether or not the item [n] is the non-display target is determined at step S607. When it is determined that the item [n] is not the non-display target, the determination from step S605 is repeated for a next item [n+1]. When it is determined that the item [n] is the non-display target, the procedure proceeds to step S608 at which the item [n] is hidden in the menu so as not to be displayed in the menu screen.

Next, whether or not the item [n] has been registered in the My Menu is determined at step S609. When it has not been registered in the My Menu, the determination from step S605 is repeated for the next item [n+1]. When it has been registered in the My Menu, the procedure proceeds to step S610 at which registration of the item [n] is reset in the My Menu.

When reaching an end of the loop at step S611 after repeating the determination for an item [1] to an item [N], a menu configuration of the camera is defined at this time.

The system control unit 4 saves the type information of the mount acquired at step S603 in the SRAM 11 at step S612. At this time, the acquired type information is overwritten and saved to the type information of the mount saved in advance. Since the voltage is supplied from the backup power 12 to the SRAM 11, even when the power of the camera is turned off, the type information of the mount is kept on being held.

At step S613, the menu setting is totally initialized and the items [1] to [N] are initialized. This is a process for preventing inconsistency of the setting, which is caused by switching the menus of "display" and "non-display", and the initialization may be performed by limiting a target to be initialized to a part of the items. The process so far makes the camera in a state of being allowed to operate with a setting suitable for the mount 13.

Step S614 is a main routine of camera control, at which the operation as the camera is started. Details of the main routine of camera control will be described below.

The system control unit 4 acquires the state of the power switch for monitoring at step S615. The system control unit 4 confirms whether or not the power switch remains in the on state at step S616. When the power switch remains in the on state, the procedure returns to step S614, and when the power switch is in the off state, the procedure exits the present process.

Figure 7:
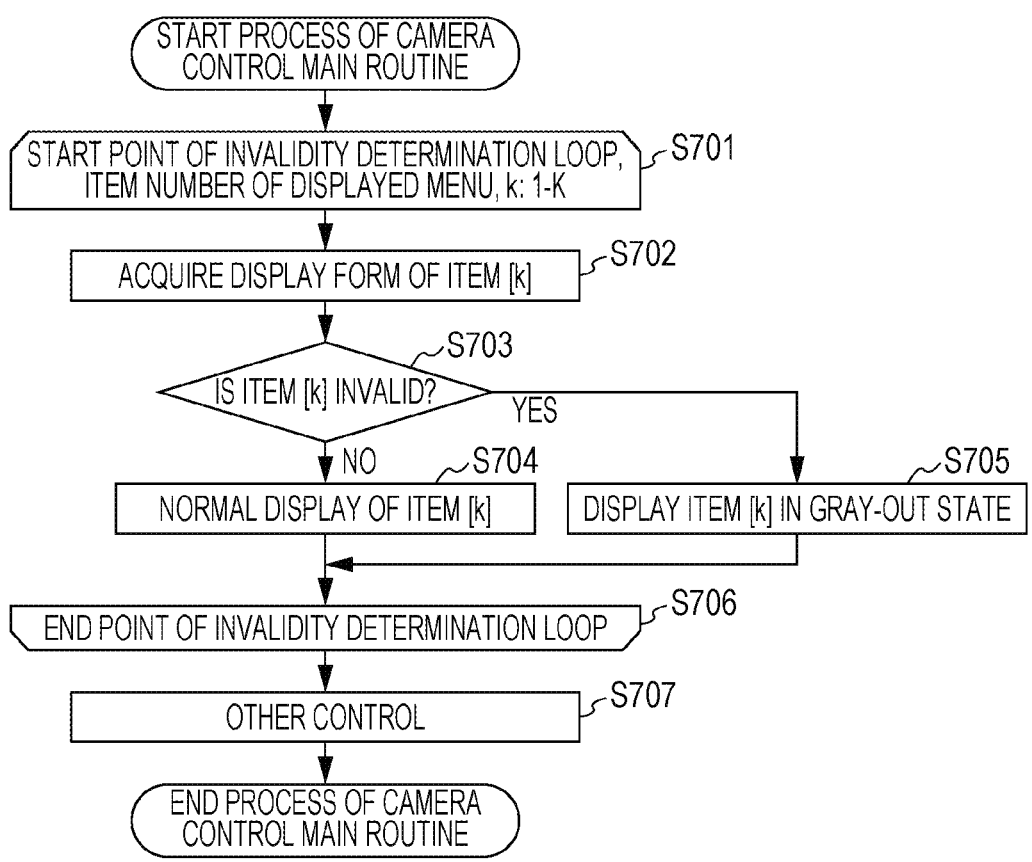
FIG. 7 is a flowchart illustrating details of a main routine of camera control in FIG. 6.

FIG. 7 is a flowchart illustrating details of the main routine of camera control at step S614.

Steps S701 to S706 serve as a routine of a process for determining invalidity.

Step S701 serves as a start point of a loop, at which items of k=1 to K are in the displayed menu.

In order to perform invalidity determination for the items in the displayed menu one by one, a display form of an item [k] is acquired at step S702.

Whether or not the item [k] is a target of invalid display is determined at step S703. Since the type of the mount is not acquired here, only determination of "display" and "invalid display" is performed. When it is determined that the item [k] is not the target of the invalid display, the procedure proceeds to step S704 at which the item [k] is normally displayed. When it is determined that the item [k] is the target of the invalid display, the procedure proceeds to step S705 at which the item [k] is displayed in a gray-out state.

When reaching an end of the loop at step S706 after repeating the determination for an item [1] to an item [K], the procedure proceeds to step S707 at which other control is executed. Other control is a main process as the camera, for example, such as lens control, sensor control, recorder control, and UI control, other than control of the menu.

Details of the process for performing determination of mount interchange when the camera according to the present exemplary embodiment starts and updating the menu and the My Menu are as described above.

Here, the determination of the mount interchange is performed only when the camera starts (power is turned on). As a reason therefor, a first point is that it is not recommended to interchange the mount when the power of the camera is in the on state because of possibility of causing electrical short-circuit. A second point is that there is a case where it is difficult to make the menu setting in a state without inconsistency under a situation where there is a reason for necessity of interchanging the mount even with a risk of causing electrical short-circuit.

Figure 8A:
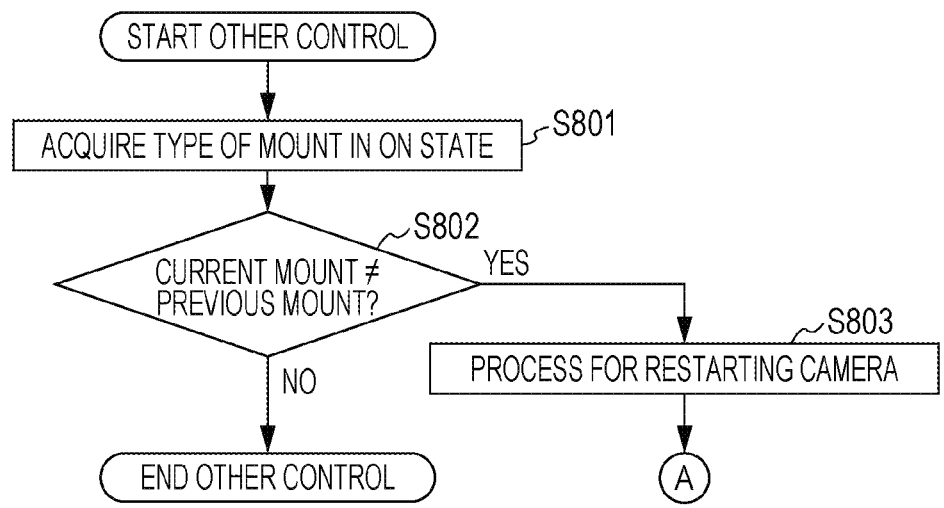
FIG. 8A is a flowchart illustrating details of one example of other control in FIG. 7.
Figure 8B:
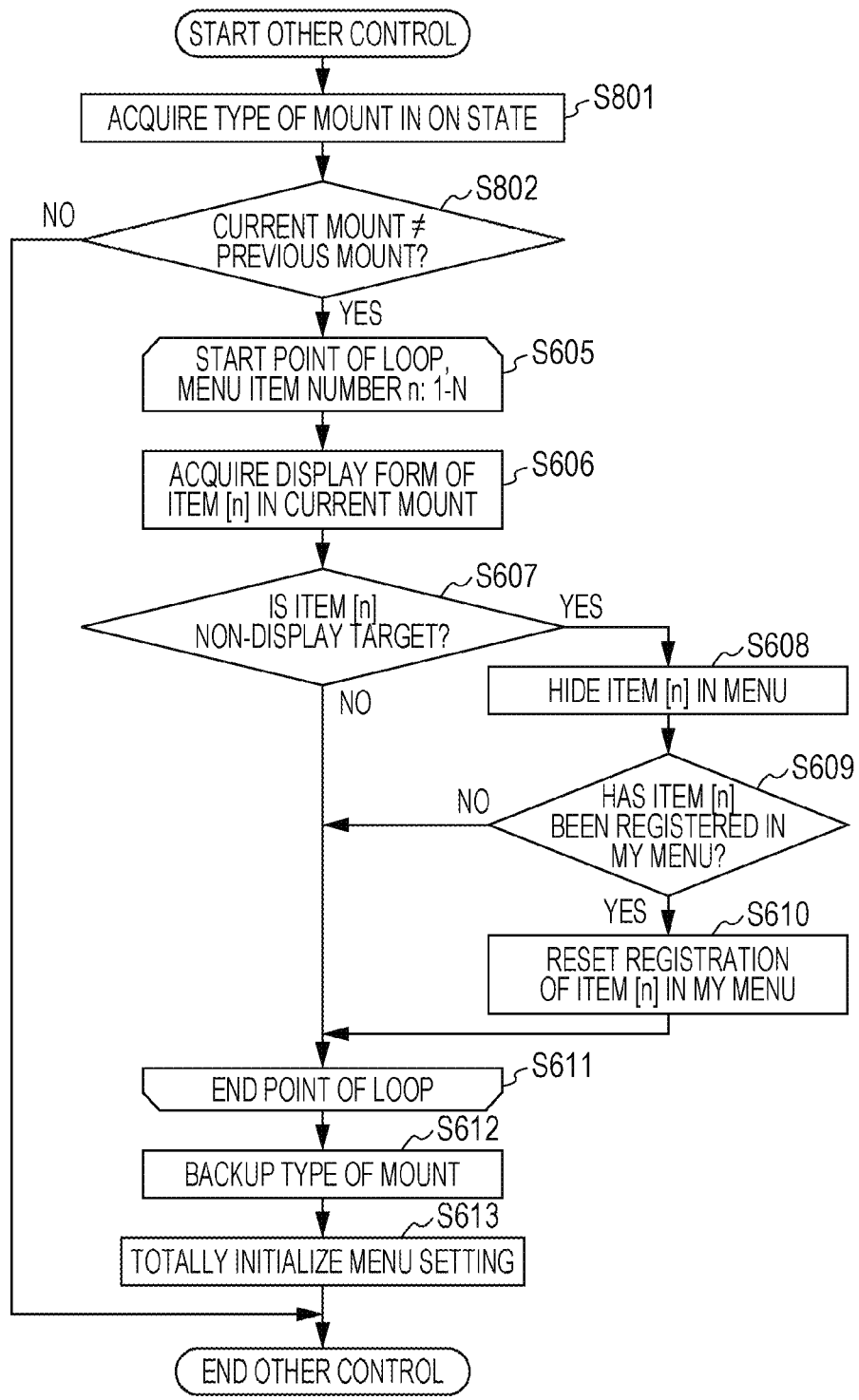
FIG. 8B is a flowchart illustrating details of one example of other control in FIG. 7.

Among them, the second point depends on a system, so that it is possible to realize the menu setting without inconsistency when a process as illustrated in FIG. 8A or FIG. 8B is able to be executed.

FIG. 8A is a flowchart illustrating details of one example of other control of step S707. At step S801, the system control unit 4 discriminates and acquires a type of the mount with the mount detection unit 15 as described in FIGS. 2A and 2B.

The system control unit 4 confirms whether or not the current mount has the same type of the mount stored in the SRAM 11 at step S802. When it is determined as the same type at step S802, the procedure exits the present process. On the other hand, when it is determined as not the same type, that is, determined that the mount has been interchanged at step S802, the procedure proceeds to step S803 at which the camera is restarted. The process for restarting the camera at step S803 is a sequential end process for turning off the power of the camera, and when it is ready to restart the camera, the procedure proceeds to step S603 of FIG. 6.

However, when considering that work is made with a risk of interchanging the mount with the power in the on state intentionally, the process of FIG. 8A involving restarting of the camera is also considered to be an operation not desired by the user.

Thus, the camera is prevented from restarting in FIG. 8B. FIG. 8B is a flowchart illustrating details of one example of other control of step S707, in which the same reference signs are assigned to the same processes as those of FIG. 6 and FIG. 8A, and the description thereof will be omitted.

In the flowchart of FIG. 8B, the acquisition of the type of the mount in the on state at step S801 and the determination of the mount interchange at step S802 are similar to those of FIG. 8A. When it is determined as not the same type, that is, determined that the mount has been interchanged at step S802, similarly to FIG. 6, the processes from the routine of the updating process at steps S605 to S611 to the total initializing of the menu setting at step S613 are executed. This makes it possible to achieve the same effect as the effect achieved by performing these processes when the camera is started.

However, a series of initializing processes includes a process which requires much processing time in some cases, and whether these processes are able to be executed while keeping the operation of the camera depends on the system. In this manner, it is not required to perform the determination of the mount interchange only when the camera is started as long as control as illustrated in FIGS. 8A and 8B can be performed.

Second Exemplary Embodiment

Next, a second exemplary embodiment will be described. Though description has been given in the first exemplary embodiment for the example in which the mount interchange is determined based on a type of the mount, an example in which a similar process is performed by using other information as a criterion of determination will be described in the second exemplary embodiment. Note that, the configuration of the camera and the basic operation are similar to those of the first exemplary embodiment, and a difference from the first exemplary embodiment will be mainly described below.

Figure 9:
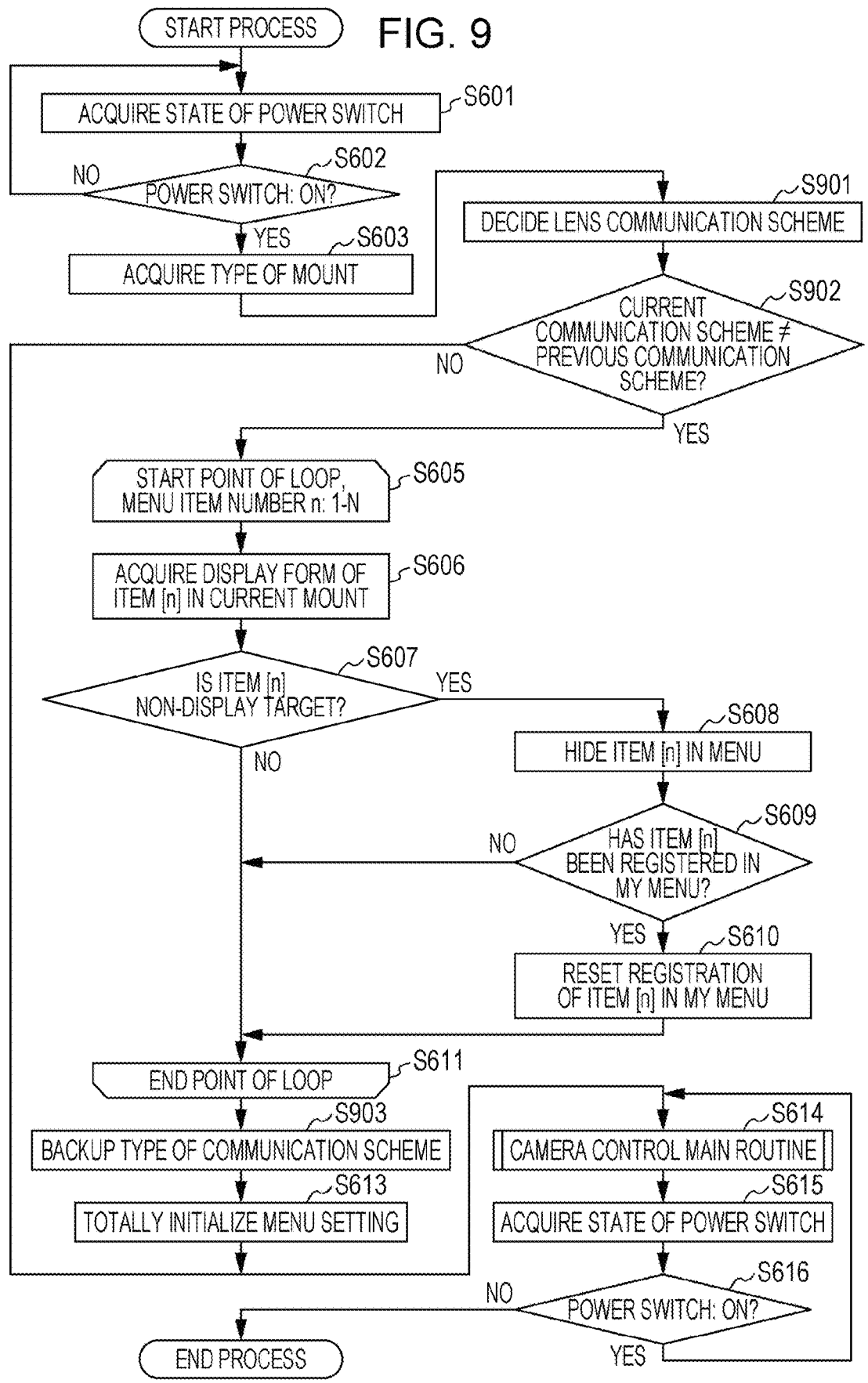
FIG. 9 is a flowchart illustrating an example of a process for performing determination of mount interchange when a camera according to a second exemplary embodiment starts and updating a menu and a My Menu.

FIG. 9 is a flowchart illustrating an example of a process for performing determination of mount interchange when a camera according to the present exemplary embodiment starts and updating a menu and a My Menu, in which the same reference signs are assigned to the same processes as those of FIG. 6, and the description thereof will be omitted.

After the type of the mount is acquired at step S603, communication in a format according to the type of the mount needs to be performed with the lens 14, so that a lens communication scheme is decided at step S901.

The system control unit 4 confirms whether or not the current lens communication scheme is the same as the lens communication scheme when the camera starts in the previous time at step S902. When it is determined as the same lens communication scheme at step S902, the procedure proceeds to step S614. On the other hand, when it is determined as not the same lens communication scheme, that is, determined that the mount has been interchanged, the procedure proceeds to step S605.

After the update process routine of steps S605 to S611, the system control unit 4 saves lens communication scheme information in the SRAM 11 at step S903, and uses the lens communication scheme information for the determination when the camera starts next time.

Even when performing control with the lens communication scheme as a reference as described above, the similar process is able to be realized.

Though a sequence of the example in which all items of the menu are initialized as the total initializing of the menu setting at step S613 is indicated in the exemplary embodiments described above, all the items are not necessarily targeted. For example, the updating process may be realized by initializing, for example, only an item which is associated with the mount. The updating process may be realized even with a mechanism in which the setting of the menu is held in a separate SRAM 11 for each mount.

Though the discussions are made by assuming that registration is cancelled in the My Menu after hiding an item of the menu, which is not usable for the mount, the updating process may be realized by setting all corresponding items to the invalid display (gray-out display).

Moreover, the discussions are made by assuming that the menu and the My Menu are updated triggered by the mount interchange in the mount determination at step S604, a timing thereof is not limited thereto. For example, it may be set that the processes at steps S607 to S610 are always performed when the camera is started, and only the backup of the mount type at step S612 and the total initializing of the menu setting at step S613 are performed when mount interchange is detected. Further, the similar effect is achieved also by performing only the total initializing of the menu setting at step S613 when the mount interchange is detected.

Though the present invention has been described above with reference to exemplary embodiments, the exemplary embodiments above illustrate only embodying examples for implementing the present invention, and the technical scope of the present invention may not be limitedly understood due to such examples. That is, the present invention may be implemented in a variety of forms without departing from the technical concept or the main features of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an aspect of the present invention, a menu and a My Menu are automatically updated according to mount interchange, with neither labor nor consciousness of a user. This makes it possible to prevent inconsistency from occurring in a function of an image capturing apparatus after the mount interchange, so that the user is not confused.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

What is claimed is:

1. An image capturing apparatus, comprising:
a body portion capable of interchangeably attaching a first type of mount and a second type of mount to the image capturing apparatus, each of the first type of mount and the second type of mount corresponding to at least one respective type of interchangeable lens, wherein mounts of the first type of mount and the second type of mount are configured to interchangeably attach lenses of the at least one respective type of interchangeable lens to the image capturing apparatus;
at least one processor configured to perform the operations of the following units;

an identification unit configured to identify a type of a mount attached to the image capturing apparatus; and
a management unit configured to manage display of a menu,
wherein when an item included in the menu is an item corresponding to the type of mount identified by the identification unit and the item is unable to be selected by a user, the management unit displays the menu in such a way that the menu indicates that the item is unable to be selected,
wherein the management unit displays, on the menu, an item which corresponds to the type of the mount identified by the identification unit.

2. The image capturing apparatus according to claim 1, wherein the management unit is configured to manage display of the menu including a customizable menu as the item, and to manage display of the customizable menu including an item which is set by a user to be included in the customizable menu, and
wherein display of the customizable menu when the identification unit identifies the type of mount as the first type of mount is different from display of the customizable menu when the identification unit identifies the type of mount as the second type of mount.

3. The image capturing apparatus according to claim 2, wherein, in a case where the identification unit identifies the type of mount as the second type of mount, after the setting of the customizable menu corresponding to the first type of mount, the management unit manages the customizable menu so as to cancel the setting of the item.

4. The image capturing apparatus according to claim 2, wherein the management unit manages the customizable menu so as to cancel registration of the item, in a case where the type of mount identified by the identification unit does not support a function associated with the item.

5. The image capturing apparatus according to claim 1, wherein, upon the image capturing apparatus being turned on, the identification unit identifies the type of the mount attached to the image capturing apparatus.

6. The image capturing apparatus according to claim 5, wherein in response to the identification unit determining that the type of the mount attached to the image capturing apparatus is different from the type of mount identified as being the type of the mount attached to the image capturing apparatus when the image capturing apparatus was turned on, the image capturing apparatus restarts.

7. The image capturing apparatus according to claim 5, wherein in response to the identification unit determining that the type of the mount attached to the image capturing apparatus is different from the type of mount identified as being the type of the mount attached to the image capturing apparatus when the image capturing apparatus was turned on, the management unit manages the menu so as not to display an item which does not correspond to the type of mount currently identified by the identification unit as being the type of the mount currently attached to the image capturing apparatus.

8. The image capturing apparatus according to claim 1, further comprising at least one processor configured to perform the operations of:
a storage unit configured to store information indicating the type of the mount attached to the image capturing apparatus and identified by the identification unit,
wherein, when identifying the type of the mount, the identification unit compares the type of mount currently identified with the information stored in the storage unit.

9. The image capturing apparatus according to claim 8, wherein when the first type of mount identified by the identification unit as being the type of the mount currently attached to the image capturing apparatus is different from the second type of mount which is indicated by stored information stored by the storage unit, the storage unit replaces the stored information indicating the second mount type with information indicating the first mount type.

10. The image capturing apparatus according to claim 1, further comprising at least one processor configured to perform the operations of:
a determination unit configured to determine a communication scheme with an interchangeable lens currently attached to the image capturing apparatus, based on the type of the mount identified by the identification unit; and
a storage unit configured to store communication scheme information regarding the communication scheme determined by the determination unit, wherein before the communication scheme information regarding the communication scheme determined by the determination unit is stored in the storage unit, the image capturing apparatus compares the communication scheme determined by the determination unit with communication scheme information previously stored in the storage unit to determine mount interchange.

11. The image capturing apparatus according to claim 1, wherein the management unit manages the menu so as not to display an item which does not correspond to the type of mount currently identified by the identification unit.

12. The image capturing apparatus according to claim 1, wherein the management unit manages the menu so as to gray-out display an item which does not correspond to the type of mount currently identified by the identification unit.

13. A control method of an image capturing apparatus, the image capturing apparatus having a body portion capable of interchangeably attaching a first type of mount and a second type of mount to the image capturing apparatus, each of the first type of mount and the second type of mount corresponding to at least one respective type of interchangeable lens, wherein mounts of the first type of mount and the second type of mount are configured to interchangeably attach lenses of the at least one respective type of interchangeable lens to the image capturing apparatus, the control method comprising:
a step of identifying a type of a mount attached to the image capturing apparatus; and
a step of managing display of a menu,
wherein when an item included in the menu is an item corresponding to the type of mount identified by the identification unit and the item is unable to be selected by a user, the managing displays the menu in such a way that the menu indicates that the item is unable to be selected,
wherein in the step of managing, on the menu, an item which corresponds to the type of the mount is identified in the step of identifying.

14. The control method according to claim 13, wherein the managing manages display of the menu including a customizable menu as the item, and manages display of the customizable menu including an item which is set by a user to be included in the customizable menu, and wherein display of the customizable menu when the identification unit identifies the type of mount as the first type of mount is different from display of the customizable menu when the identification unit identifies the type of mount as the second type of mount.

15. A non-transitory computer-readable storage medium storing a program for causing an image capturing apparatus to execute a method, the image capturing apparatus having a body portion capable of interchangeably attaching a first type of mount and a second type of mount to the image capturing apparatus, each of the first type of mount and the second type of mount corresponding to at least one respective type of interchangeable lens, wherein mounts of the first type of mount and the second type of mount are configured to interchangeably attach lenses of the at least one respective type of interchangeable lens to the image capturing apparatus, the method causing a computer of the image capturing apparatus to function as:

an identification unit configured to identify a type of a mount attached to the image capturing apparatus; and a management unit configured to manage display of a menu, wherein when an item included in the menu is an item corresponding to the type of mount identified by the identification unit and the item is unable to be selected by a user, the management unit displays the menu in such a way that the menu indicates that the item is unable to be selected, wherein the management unit displays, on the menu, an item which corresponds to the type of the mount identified by the identification unit.

16. The non-transitory computer-readable storage medium according to claim 15, wherein the managing manages display of the menu including a customizable menu as the item, and manages display of the customizable menu including an item which is set by a user to be included in the customizable menu, and wherein display of the customizable menu when the identification unit identifies the type of mount as the first type of mount is different from display of the customizable menu when the identification unit identifies the type of mount as the second type of mount.

\* \* \* \* \*